United States Patent [19]

Tanaka

[11] Patent Number: 5,202,789
[45] Date of Patent: Apr. 13, 1993

[54] OPTICAL SYSTEM FOR PRESERVING A STATE OF POLARIZATION OF LIGHT BEAM

[75] Inventor: Masahiko Tanaka, Yokohama, Japan

[73] Assignee: Kabushiki Kaisha Toshiba, Kawasaki, Japan

[21] Appl. No.: 657,362

[22] Filed: Feb. 19, 1991

Related U.S. Application Data

[63] Continuation of Ser. No. 257,520, Oct. 14, 1988, abandoned.

[30] Foreign Application Priority Data

Oct. 16, 1987 [JP] Japan .................. 62-261187
Nov. 25, 1987 [JP] Japan .................. 62-296820

[51] Int. Cl.$^5$ .................. G02B 1/09; G02B 27/12; G11B 5/127
[52] U.S. Cl. .................. 359/281; 359/283; 359/639; 360/114; 365/122
[58] Field of Search ............... 350/388, 403, 355, 111, 350/382, 384, 385, 389, 390, 394–396, 400–401, 405–407, 370, 377, 286, 173; 365/119–122; 356/388; 333/16, 18; 370/19–25; 369/100, 110, 44.17–44.19, 44.21–44.23, 13, 110, 112; 359/618–640, 281–283, 483–502, 831–837; 360/114, 112; 250/201.5

[56] References Cited

U.S. PATENT DOCUMENTS

| | | | |
|---|---|---|---|
| 4,124,273 | 11/1978 | Hulgnard et al. | 350/388 |
| 4,439,014 | 3/1984 | Stacy et al. | 350/388 |
| 4,451,913 | 5/1984 | Elliott | 369/110 |
| 4,682,311 | 7/1987 | Matsusayashi et al. | 350/401 |
| 4,729,122 | 3/1988 | Itoh | 369/110 |
| 4,825,428 | 4/1989 | Toki | 365/122 |
| 4,933,794 | 6/1990 | Gitto | 350/400 |
| 5,004,326 | 4/1991 | Sasaki | 350/375 |

FOREIGN PATENT DOCUMENTS

| | | |
|---|---|---|
| 0229035 | 7/1987 | European Pat. Off. |
| 2459991 | 1/1981 | France |
| 598148 | 1/1984 | Japan |

OTHER PUBLICATIONS

Optics–Chapter 16, pp. 346–357, Fincham et al., Walter Henry Anpel distribution–9th edition, 1980.

Primary Examiner—Bruce Y. Arnold
Assistant Examiner—Thong Nguyen
Attorney, Agent, or Firm—Oblon, Spivak, McClelland, Maier & Neustadt

[57] ABSTRACT

First and second beam splitters are arranged on the optical path of a light beam emerging from a recording surface, and such that the phases and amplitudes of the respective polarized light components of a light beam incident thereon are changed to equal extends. As a result of this arrangement, the state of polarization beam of the light beam emerging from the recording surface is maintained when a light beam is outputted through the two beam splitters. Stable reproduction signals and servo control signals for focusing, tracking, and the like can be reliably supplied by utilizing an apparatus of this invention.

28 Claims, 11 Drawing Sheets

OPTICAL SYSTEM FOR PRESERVING A STATE OF POLARIZATION OF LIGHT BEAM

This application is a continuation of application Ser. No. 07/257,520, filed on Oct. 14, 1988, now abandoned.

BACKGROUND OF THE INVENTION

1. Field of the Invention

The present invention relates to an optical system for preserving a state of polarization of light beam and, more particularly, to an optical system for stably detecting a light beam reflected or transmitted by an optical memory.

2. Description of the Related Art

A data recording/reproducing apparatus for optically reproducing recorded data and for optically recording data has been developed, which uses an optical disk, an optical card, or an optical tape as an optical memory for storing data. An optical card, for example, generally comprises a recording layer formed on a transparent substrate and a transparent protective layer formed on the recording layer. When data thereon is to be reproduced, for example, a light beam is radiated onto a recording surface by an optical head through this substrate or the protective layer. Then, the light beam is intensity-modulated in accordance with the data on the recording surface, and is reflected thereby. The reflected light beam is picked up by an optical head arranged in the data recording/reproducing apparatus and is converted into an electrical signal to be used as a readout signal or a servo control signal. It should be understood that "optical head" is, in the case of this description, a general term used to denote a set of devices for radiating a light beam on an optical memory, detecting the light beam from the optical memory by means of an optical detector, and obtaining a readout signal for reproducing data and a servo control signal used for focusing, tracking, and the like.

A conventional optical head includes, for example, a polarization beam splitter so as to split a light beam radiated onto an optical memory from a light beam reflected by the optical memory, and a λ/4 plate. In the case of the conventional optical head, a light beam emitted from a light source is directed while being linearly polarized (p-polarized light) so as for the beam to be transmitted through the polarization beam splitter at a transmittance of 100%. The light beam transmitted through the polarization beam splitter is converted into circularly polarized light by the λ/4 plate arranged on its optical path, and is radiated onto the recording surface of the optical memory. The light beam reflected by the recording surface is transmitted through the λ/4 plate again, is converted into linearly polarized light beam (s-polarized light) having its polarization direction rotated by 90° with respect to incidence beam polarization direction. Then, the s-polarized light beam is returned to the polarization beam splitter. The polarization beam splitter reflects the s-polarized light beam at a reflectivity of 100%. The s-polarized light beam radiates onto the optical detector, where it is converted into an electrical signal in accordance with the intensity of the light beam. The electrical signal is used as a readout signal and a servo control signal. As described above, a light beam which is reflected by the optical memory and is returned to the polarization beam splitter through the λ/4 plate is ideally linearly polarized light (s-polarized light). An optical head comprising such a polarization beam splitter and λ/4 plate is disclosed in U.S. Pat. No. 4,451,913.

However, as circularly polarized light beam is radiated onto an optical memory, a light beam reflected by optical memory is elliptically polarized, not circular, because of the effect of the substrate and the protective layer birefringence. As a result, a different elliptically polarized light beam is returned to the polarization beam splitter after transmitting the λ/4 plate, and hence the intensity of the light beam reflected by the polarization beam splitter is decreased. A resin material such as polycarbonate is generally used for the substrate and the protective layer of an optical card. Since these resin materials have asymmetrical crystal structures, they are birefringent (i.e. the propagation speeds of polarized light beams having different polarization direction differ from each other). For this reason, when a light beam passes through the protective layer, retardation necessarily occurs. That is, since the phase of one polarized component of the light beam is delayed with respect to the phase of the other polarized component thereof, an elliptically polarized light beam is reflected by the optical memory. If, for example, retardation caused by the substrate or the protective layer birefringence is γ, intensity of detected light varies in proportion to $\cos^2(\gamma/2)$. According to $\cos^2(\gamma/2)$, therefore, as retardation γ due to birefringence is increased, the intensity of the detected light is reduced. When γ=180°, the light intensity becomes zero. Accordingly, if a retaration due to birefringence is large, a readout signal and servo control signals cannot be stably obtained.

As described above, according to the conventional optical head, a light intensity detected by the optical detector is decreased because of the influences of the substrate and the protective layer birefringence, thereby posing a problem that readout signals and servo control become unstable. Another problem is that the polarization state of a light beam emerging from a recording surface cannot be maintained.

SUMMARY OF THE INVENTION

It is an object of the present invention to provide an optical system for preserving a state of polarization of light beam.

It is another object of the present invention to provide an optical system capable of minimizing the influences of protective layer birefringence.

An optical system for preserving a state of polarization of light beam from an optical memory according to the present invention, comprises:

a first beam splitter for reflecting (transmitting) a light beam from the optical memory; and a second beam splitter, having the same optical properties as the first beam splitter, for reflecting (transmitting) the light beam reflected (transmitted) by the first beam splitter so as to preserving a state of polarization of the light beam emerging from the optical memory.

According to the present invention, a light beam converted into an elliptically polarized light beam is reflected or transmitted through the first and second beam splitters, which have the same optical properties, by a predetermined method. With this operation, both the p- and s-polarized light components influenced by birefringence are equally subjected to amplitude and phase shift operations, and the state of polarization is preserved. As a result, the intensity of the overall reflected light is not influenced by birefringence, and a constant intensity can be obtained.

DETAILED DESCRIPTION OF THE PREFERRED EMBODIMENTS

Figure 1:
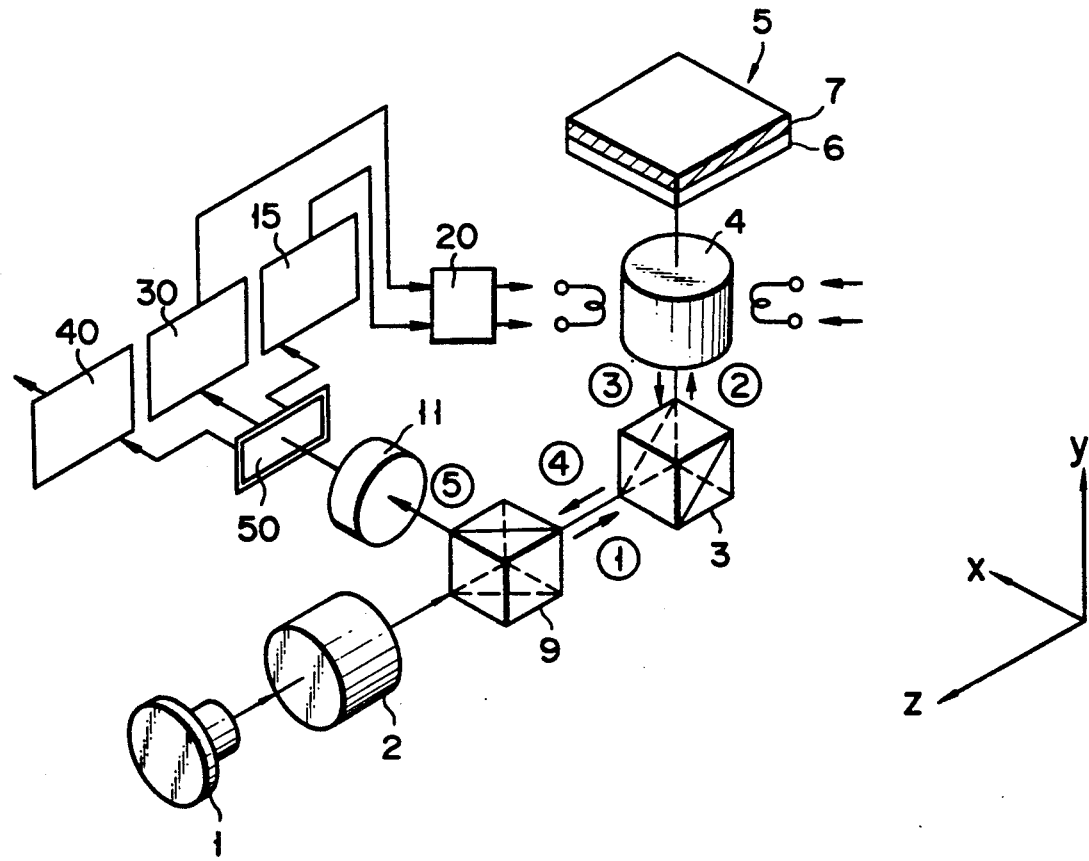
FIG. 1 is a schematic view of an optical system according to a first embodiment of the present invention and its signal processing circuit.

FIG. 1 is a schematic view showing an optical system according to a first embodiment of the present invention and its signal processing circuit. Referring to FIG. 1, a light beam emitted from light source 1 such as a semiconductor laser in the Z direction is collimated by collimator lens 2. The collimated light beam is transmitted through second beam splitter 9, reflected by first beam splitter 3, and incident on objective lens 4. The light beam converted into a convergent light beam by objective lens 4 is focused on recording layer 7 through transparent substrate 6 of optical memory (e.g., an optical card) 5. The light beam is reflected by recording layer 7, is incident again beam splitter 3 via objective lens 4, and reflected in the Z direction by first beam splitter 3, and is incident on second beam splitter 9. The light beam is reflected in the X direction by second beam splitter 9, and is guided to optical detector 50 through condenser lens 11. The light beam detected by optical detector 50 is converted into electrical signals. One of electrical signals is processed by processor 40 and is used as a data reproduction signal. In addition, other signals are supplied to focusing error signal generator 15, tracking error signal generator 30, and the like, and are used as a servo signal.

The state of polarization of light beam, except for the phase of polarized light beam, transmitted through each optical part of the optical system of the present invention will be described below with reference to FIGS. 1 and 2.

In the following description, the polarized light beam is divided into two components, i.e., s-polarized light component having a plane of vibration perpendicular to a surface including the normal of a plane of incidence and the propagating direction of the light beam, and p-polarized light component having a plane of vibration parallel to a surface including the normal of the plane of incidence and the propagating direction of the light beam. The polarization direction of laser beam is defined as the X-axis direction in FIG. 1.

First and second beam splitters 3 and 9 shown in FIG. 1 have substantially the same optical properties. More specifically, assuming that the transmittance and reflectivity of first beam splitter 3 with respect to the p- and s-polarized light components are respectively set to be Tp3 and Rp3, and Ts3 and Rs3, and those of second beam splitter 9 with respect to the p- and s-polarized light components are respectively set to be Tp9 and Rp9, and Ts9 and Rs9, then relationships of Tp3=Tp9, Ts3=Ts9, Rp3=Rp9, and Rs3=Rs9 are established between first and second beam splitters 3 and 9.

With the use of such identical beam splitters, the polarization state of a light beam reflected by the optical card and incident on first beam splitter 3 and that of a light beam reflected by second beam splitter 9, i.e., a light beam incident on optical detector 50, become identical to each other. Therefore, the state of polarization and intensity of the detected light beam are not influenced by birefringence. This reason will be described below by using equations as follows.

Figure 2:
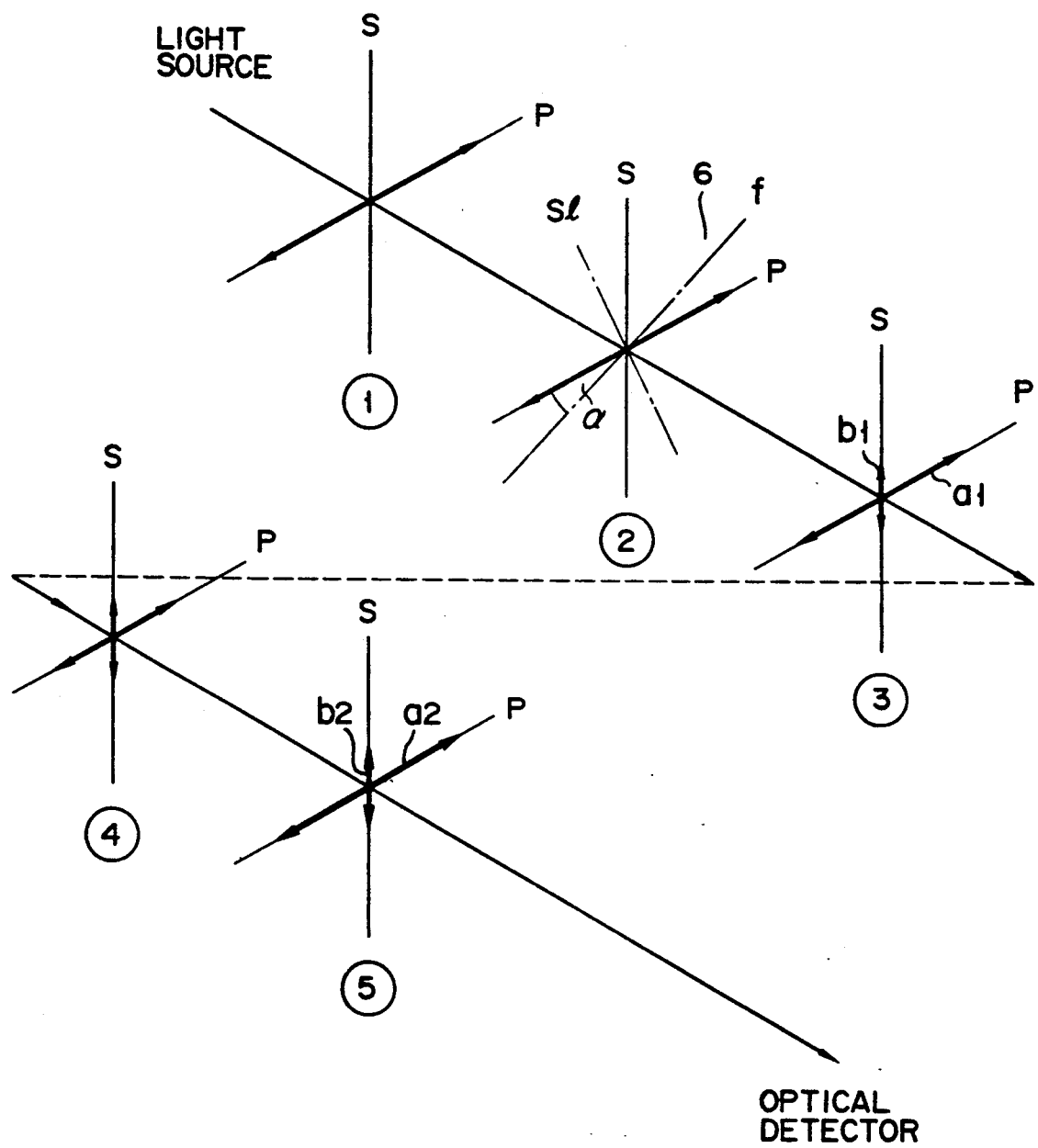
FIG. 2 is a view illustrating the polarization state of a light beam transmitted through each optical member of the optical system shown in FIG. 1.

As shown in FIG. 2, a p-polarized light beam is emitted from laser light source 1, transmitted through collimator lens 2 and second beam splitter 9, and then is incident onto first beam splitter 3. If the amplitude of the p-polarized light is ap, p- and s-polarized light components Ep1 and Es1 of the light beam before it is incident on the first beam splitter, i.e., the light beam at a position indicated by ①  in FIG. 1, are given as follows:

$$Ep1 = ap \sqrt{Tp9} \cos\omega t$$

$$Es1 = 0$$

In this case, the light intensity at ① is represented by:

$$|E1|^2 = |Ep1|^2 + |Es1|^2 = ap^2 \cdot Tp9$$

The light beam incident on the first beam splitter is reflected. First beam splitter 3 is rotated from second beam splitter 9 by 90° with respect to the Z-axis, so that reflectivity Rp3 is effected for the p-polarized light and reflectivity Rs3 is effected for the s-polarized light. P- and s-polarized light components Ep2 and Es2 of the reflected light, i.e., the light beam at a position indicated by ② in FIG. 1 are given as follows:

$$Ep2 = A\cos\omega t(A = \sqrt{Rs3} \sqrt{Tp9} \cdot ap)$$

$$Es2 = 0$$

In this case, the light intensity at ② is represented by:

$$|E2|^2 = |Ep2|^2 + |Es2|^2 = A^2$$

The light beam reflected the first beam splitter is sequentially transmitted through objective lens 4 and substrate 6, and is incident on recording layer 7. The light beam is intensity-modulated in accordance with the optical data of recording layer 7 and is reflected thereby. Then, the light beam emerges from substrate 6 through the same optical path as described above. The state of polarization of the light beam is disturbed by substrated birefringence when it is transmitted through substrate 6 consisting of polycarbonate, polymethyl methacrylate, or the like. For this reason, the linearly polarized light beam having only the p-polarized light component incident onto substrate 6 is converted into an elliptically polarized light beam, that the light beam has including the p- and s-polarized light components and the p-polarized light component has retardation with respect to s-polarized light component when it emerges from substrate 6.

More specifically, polycarbonate or polymethyl methacrylate constituting substrate 6 has different refractive index along the axes of f-sl as shown in FIG. 2, polarized light beams propagating at different speeds in the directions of the respective axes (f- and sl-axes). For example, assume that the phase of polarized light beam of the sl-axis with respect to the f-axis direction is delayed by $\gamma$ (this phase delay is called retardation) when the light incident on optical memory 5 is transmitted through substrate 6 twice, and the f-sl axis is tilted with respect to the p-s axis at an argument $\alpha$. In addition, reflectivity R7 is considered with respect to a light beam incident on and reflected by recording layer 7. In this case, the p- and s-polarized light components of the elliptically polarized light beam emerging from the substrate at a position indicated by ③ in FIG. 1 are given as follows:

$$Ep3 = \sqrt{R7} A\{(\cos^2\alpha + \cos\gamma\sin^2\alpha)\cos\omega t - \sin\gamma\sin^2\alpha\sin\omega t\}$$

$$Es3 = \sqrt{R7} A\{\cos\alpha\sin\alpha(1 - \cos\gamma)\cos\omega t + \sin\gamma\cos\alpha\sin^2\alpha\sin\omega t\}$$

Therefore, the intensities of the p- and s-polarized light components are represented by:

$$|Ep3|^2 = R7A^2(1 - \sin^2\gamma/2 \sin^2 2\alpha)$$

$$|Es3|^2 = R7A^2 \sin^2\gamma/2 \sin^2 2\alpha$$

The components influenced by birefringence (term of $\gamma$) have identical amplitude terms $R7A^2$ but vary in opposite relation to each other. Therefore, the intensity of the overall light beam at ③ is represented by:

$$|E3|^2 = |Ep3|^2 + |Es3|^2 = R7A^2$$

This result clearly shows that the p- and s-polarized light components of the light beam emerging from substrate 6 are influenced by birefringence, but the light intensity at ③ is not influenced by birefringence.

Subsequently, the elliptically polarized light beam emerging from substrate 6 is incident on first beam splitter 3 again. The incident light is reflected by first beam splitter 3 at reflectivities Rs3 and Rp3 and is output from beam splitter 3. The output light beam, i.e., the p- and s-polarized light components at ④ are given are follows:

$$Ep4 = \sqrt{Rs3} \sqrt{R7A^2} \{(\cos^2\alpha + \cos\gamma\sin^2\alpha)\cos(\omega t - \delta s3) - \sin\gamma\sin^2\alpha\sin(\omega t - \delta s3)\}$$

$$Es4 = \sqrt{Rp3} \sqrt{R7A^2} \{\cos\alpha\sin\alpha(1 - \cos\gamma)\cos(\omega t - \delta p3) + \sin\gamma\cos\alpha\sin^2\alpha\sin(\omega t - \delta p3)\}$$

where $\delta p3$ and $\delta s3$ are the phase shift amounts of the p- and s-polarized light components generated when the light beam is reflected by first beam splitter 3. Generally, Rp3 is different from Rs3, and $\delta p3$ is different from $\delta s3$.

The state of polarization can be determined by the amplitude ratio between p- and s-polarized light beams, and the relative phase difference therebetween. In general, reflectivities Rp3 and Rs3 with respect to the p- and s-polarizations of beam splitters differ from each other, and phase-shifts occurring upon reflections also differ from each other. Therefore, a light beam after being reflected by the beam splitter, differs from one before the reflection, in the amplitude ratio between the p- and s-polarizations, and in the relative phase difference. Consequently, the state of polarization is not preserved when the light beam is reflected by only one beam splitter.

The polarization state and intensity of the light beam reflected by beam splitter 3 are influenced by the birefringence due to the optical memory.

The light beam emitting from first beam splitter 3 is incident on beam splitter 9, and is reflected by its at reflectivities Rs9 and Rp9. The p- and s-polarized light components reflected at this time, i.e., at a position indicated by ⑤ in FIG. 1 are given as follows:

$$Ep5 = \sqrt{Rp9} \sqrt{Rs3} \sqrt{R7A^2} \{(\cos^2\alpha + \cos\gamma\sin^2\alpha)\cos(\omega t - \delta s3 - \delta p9) - \sin\gamma\sin^2\alpha\sin(\omega t - \delta s3 - \delta p9)\}$$

$$Es5 = \sqrt{Rs9} \sqrt{Rp3} \sqrt{R7A^2} \{\cos\alpha\sin\alpha(1 - \cos\gamma)\cos(\omega t - \delta p3 - \delta s9) + \sin\gamma\cos\alpha\sin^2\alpha\sin(\omega t - \delta p3 - \delta s9)\}$$

Figure 3:
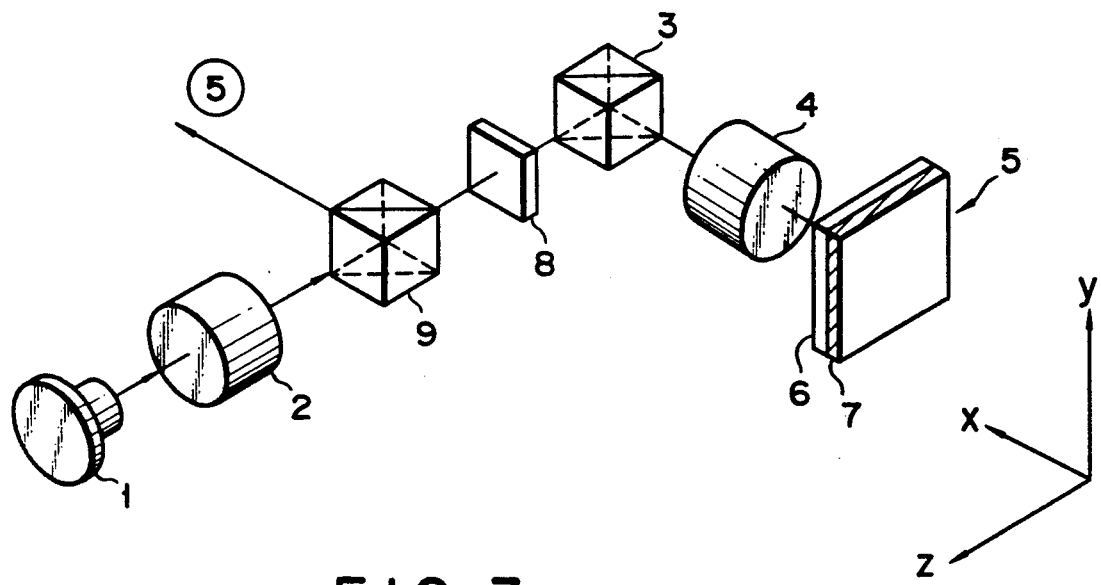
FIG. 3 is a perspective view showing an optical system according to a second embodiment of the present invention.

In this case, since first and second beam splitters 3 and 9 have the identical properties, and the phases of the polarized light component of the incident light beam are shifted from each other for $\delta p3 = \delta p9$, and $\delta s3 = \delta s9$. The p- and s-polarized light components incident on second beam splitter 9 are shifted such that the phase-shifts of the s- and p-polarized light components caused by first beam splitter 3 are cancelled. In the first embodiment, the positions of first and second beam splitters 3 and 9, i.e., the bonding surfaces thereof, are set such that the phases and amplitudes of the polarized light components of a light beam emerging from optical memory 5 are equally changed. With this arrangement, the phase shift of a light beam caused when the light beam is reflected by first beam splitter 3 is cancelled by the phase shift caused when the light is reflected by second beam splitter 9. As a result, the light beam emerging from second polarization beam splitter 9, i.e., the polarization state of the light beam at a position indicated by ⑤ in FIG. 3 is output as a light beam emerging from the optical memory, i.e., light having the same polarization state as that of the light at ③. In other word, the amplitude ratio of the polarized light components at ③ and the amplitude ratio of the polarized light components at ⑤ are constant (in FIG. 2, a1: b1 = a2: b2).

The p- and s-polarized light components of the light beam emerging from second beam splitter 9, i.e., the light beam at ⑤ are given as follows: since $$|Ep5|^2 = Rp9Rs3R7A^2(1-\sin^2\gamma/2 \sin^2 2\alpha)$$

$$|Es5|^2 = Rs9Rp3R7A^2 \sin^2\gamma/2 \sin^2 2\alpha$$

therefore, the intensity of the overall light beam is represented by:

$$|E5|^2 = |Ep5|^2 + |Es5|^2$$
$$= Rp9Rs3R7A^2 + R7A^2(Rs9Rp3 - Rp9Rs3)\sin^2\gamma/2\sin^2 2\alpha$$

In this equation, first and second beam splitters 3 and 9 have the identical properties, and a relationship of Rs9Rp3 − Rp9Rs3 = 0 is established between beam splitters 3 and 9. Accordingly, retardation γ due to birefringence, i.e., the second term of equation $|E5|^2$ becomes zero. Therefore, the intensity of the light beam incident on optical detector 50, i.e., of the light at ⑤ is represented by:

$$|E5|^2 = Rp9Rs3R7A^2$$

That is, the intensity of the light beam from an optical memory depends on the reflectivity (Rs3) of first beam splitter 3, the reflectivity (Rp9) of second beam splitter 9, and the reflectivity (R7) at the recording surface. In addition, since the light beam from the recording area is reflected by first and second beam splitters 3 and 9 having the identical properties, the light beam is incident on optical detector 50 while its polarization state is kept unchanged in the same manner as that of the light beam emerging from the recording surface.

As described above, the intensity and polarization state of a light beam detected by the optical detector are not influenced by substrate birefringence. Therefore, data reproduction and servo control can be reliably performed. According to the present invention, a plane (first plane) of light beams incident on and reflected by the first beam splitter is perpendicular to a plane (second plane) of light beams incident on and reflected by the second beam splitter. However, the locations of the first and second beam splitters of the present invention are not limited to those in the first embodiment. That is, the first and second planes of the first and second beam splitters may be identical planes and a λ/2 plate may be arranged between the first and second beam splitters so as to obtain the same effects as in the first embodiment, as shown in FIG. 2.

FIG. 3 shows a second embodiment of the present invention. In the second embodiment, λ/2 plate 8 arranged in FIG. 1 is added. In this case, the first and second planes of the first and second beam splitters are identical planes, and λ/2 plate 8 is inserted between the first and second beam splitters. With this arrangement, the same effects as in the first embodiment can be obtained. That is, a polarization plane of the light beam incident on the λ/2 plate is rotated 90° in the λ/2 plate, and the light beam having the rotated polarization plane emerges from the λ/2 plate. Thus, the arrangement of the first and second beam splitters 3, 9 and the λ/2 plate shown in FIG. 2 has the same function as that of the arrangement shown in FIG. 1.

Since the polarized light components (the s- and p-polarized light components) are shifted from each other by λ/2 plate 8 so as to have a phase difference of 180°, when the light beam reflected by first beam splitter 3 is reflected by the second beam splitter the relationship between the p- and s-polarized light components is reversed. Therefore, the intensity of the light beam reflected by second beam splitter 9 is represented by $|E5|^2 = Rp9Rs3R7A^2$ in the same manner as in the first embodiment.

Figure 5:
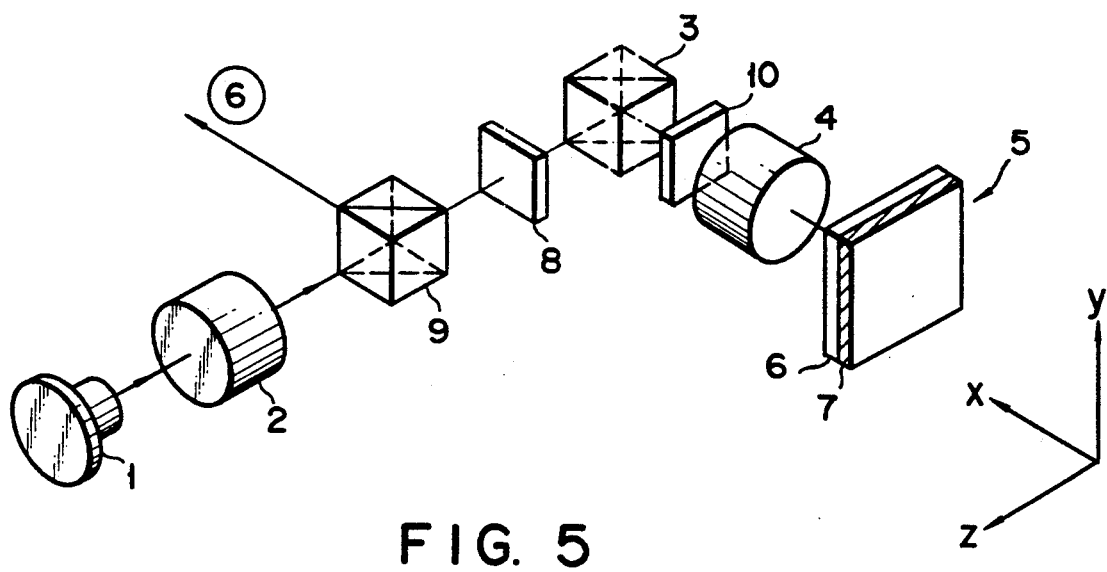
FIG. 5 is a perspective view showing an optical system according to a fourth embodiment of the present invention.
Figure 4:
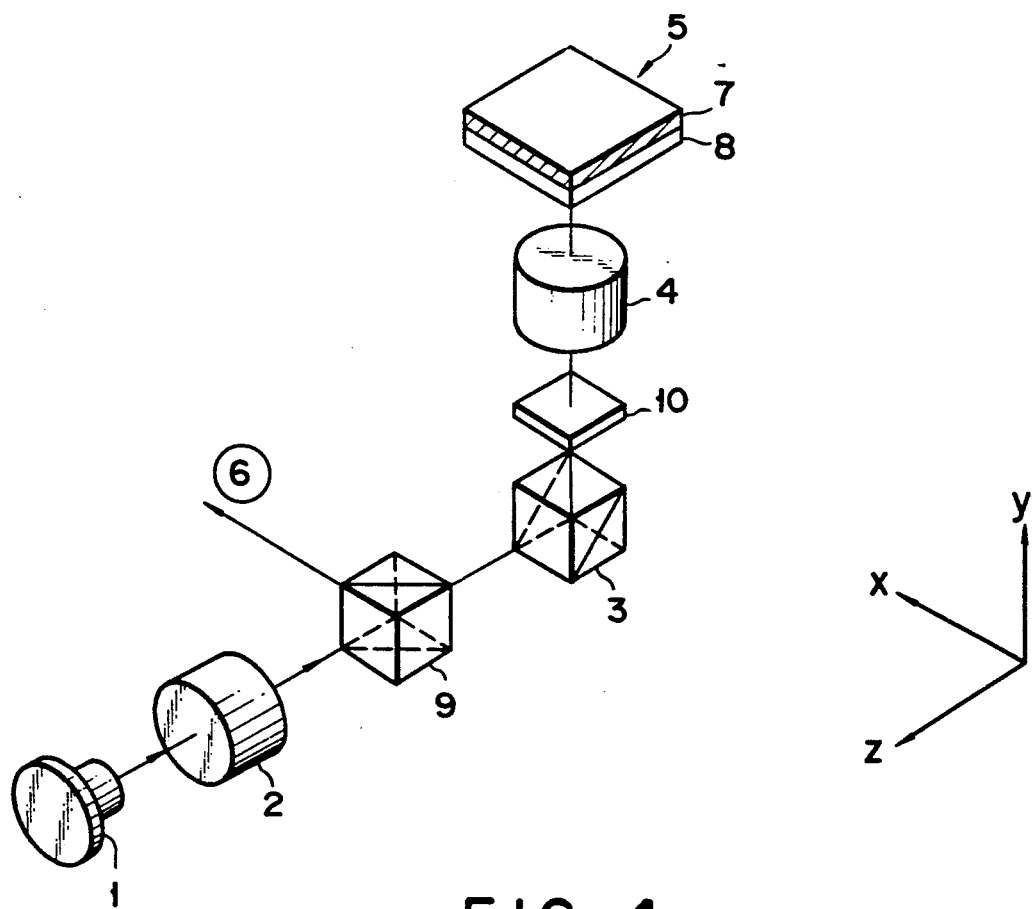
FIG. 4 is a perspective view showing an optical system according to a third embodiment of the present invention.

FIGS. 4 and 5 show third and fourth embodiments of the present invention, respectively. In the third embodiment, λ/4 plate 10 is arranged between first beam splitter 3 and objective lens 4 in the first embodiment. In the fourth embodiment, λ/4 plate 10 is arranged between first beam splitter 3 and objective lens 4 in the second embodiment. In this case, the intensity of a light beam at ⑥ in FIG. 5 after it is reflected by second beam splitter 9 is represented by:

$$|E6|^2 = R7A^2\{Rp3Rs9 + (Rs3Rp9 - Rp3Rs9)\sin^2\gamma/2\}$$

Since the beam splitters 3 and 9 have the identical properties, i.e., a relationship of Rs3Rp9 − Rp3Rs9 = 0 is established, $|E6|^2 = R7A^2Rp3Rs9$. It is appears from the equation that the intensity and polarization state of the light beam detected by the optical detector are not influenced by birefringence.

Figure 6:
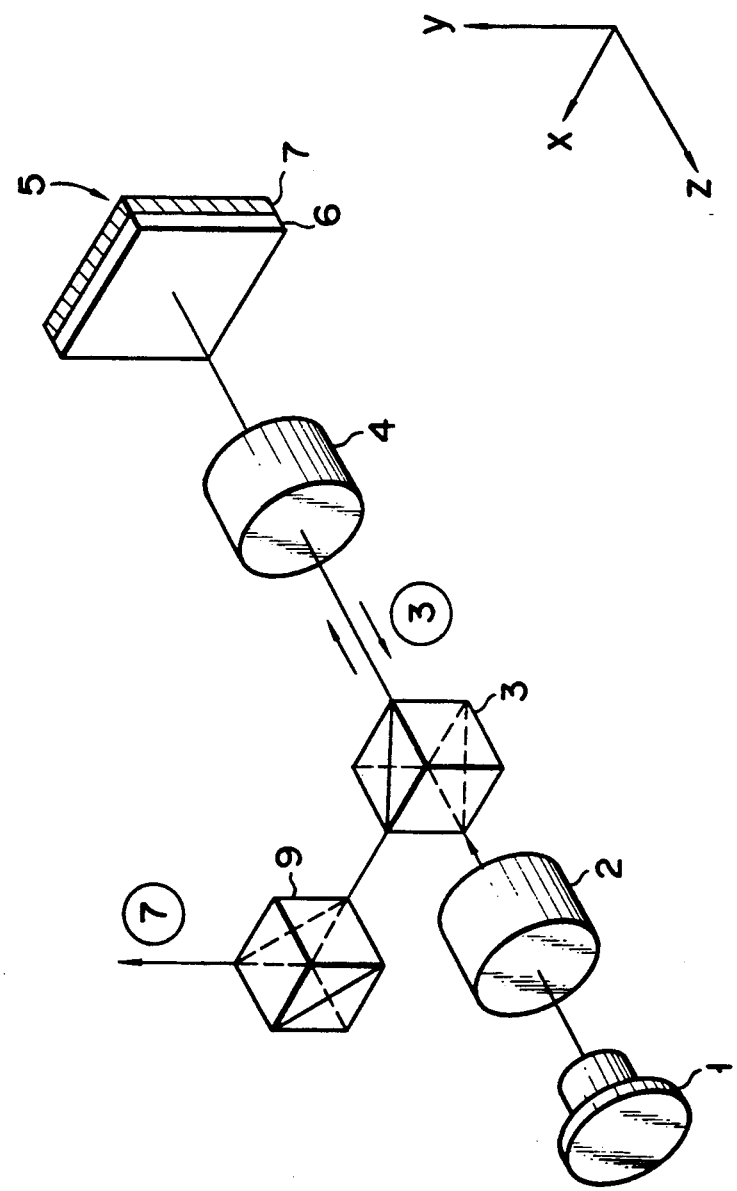
FIG. 6 is a perspective view showing an optical system according to a fifth embodiment of the present invention.

FIG. 6 shows a fifth embodiment of the present invention. A p-polarized light beam emitted from laser light source 1 and transmitted through collimator lens 2 is incident on first beam splitter 3. The light beam is transmitted through beam splitter 3, and then is radiated onto optical memory 5 through objective lens 4. The light beam radiated onto the optical memory is reflected by first beam splitter 3 and then the bonding surface of second beam splitter 9. The intensity of the light beam after it is reflected by second beam splitter 9, i.e., at a position indicated by ⑦ in FIG. 6 is:

$$|E7|^2 = R7Tp3ap^2\{Rp3Rs9 + (Rp3Rs9 - Rs3Rp9)\sin^2\gamma/2 \sin^2 2\alpha\}$$

In this case, since beam splitters 3 and 9 have the identical properties, i.e., a relationship of Rp3Rs9Rs3Rp9 = 0 is established, $|E7|^2 = R7Tp3ap^2Rp3Rs9$. Accordingly, the intensity and polarization state of the light beam detected by the optical detector are not influenced by birefringence.

Figure 7:
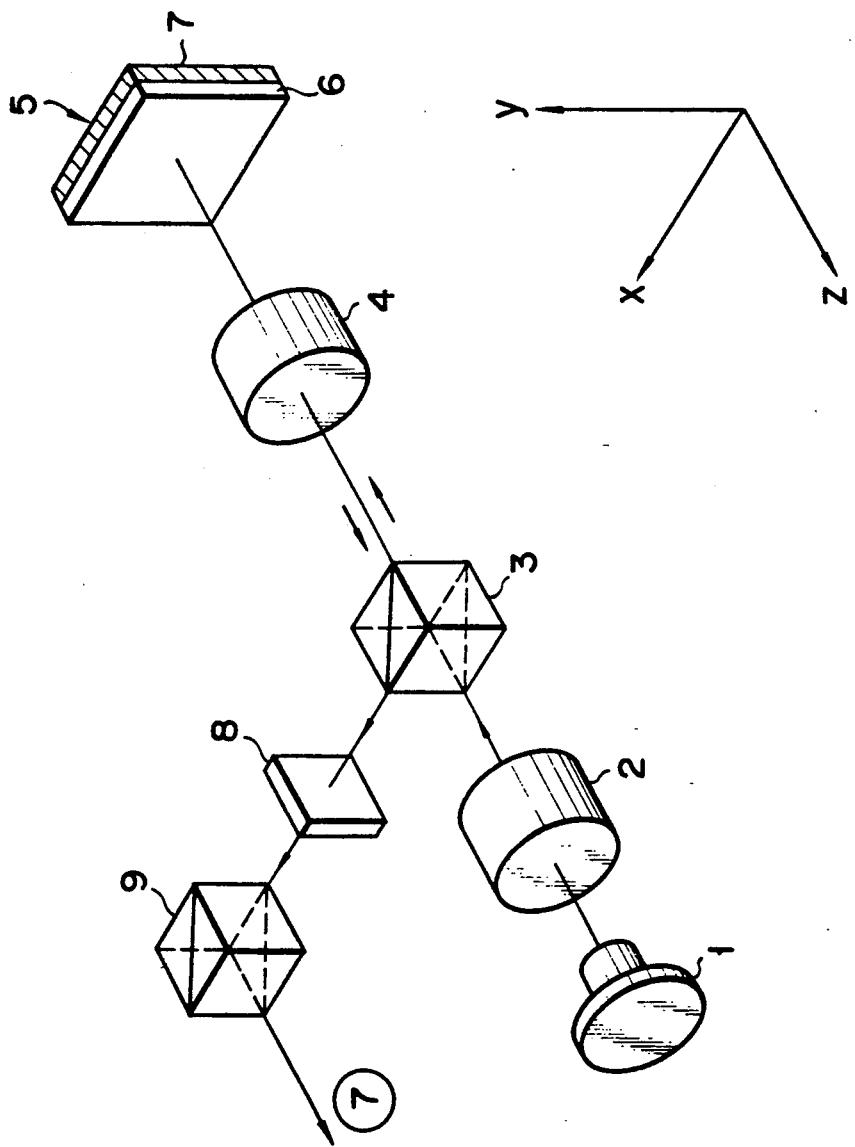
FIG. 7 is a perspective view showing an optical system according to a sixth embodiment of the present invention.

FIG. 7 shows a sixth embodiment of the present invention. The sixth embodiment is a combination of the fifth and second embodiments. That is, in the sixth embodiment, the second plane of second beam splitter is identical to the first plane of the first beam splitter, and λ/2 plate 8 is inserted between the first and second beam splitters.

Figure 9:
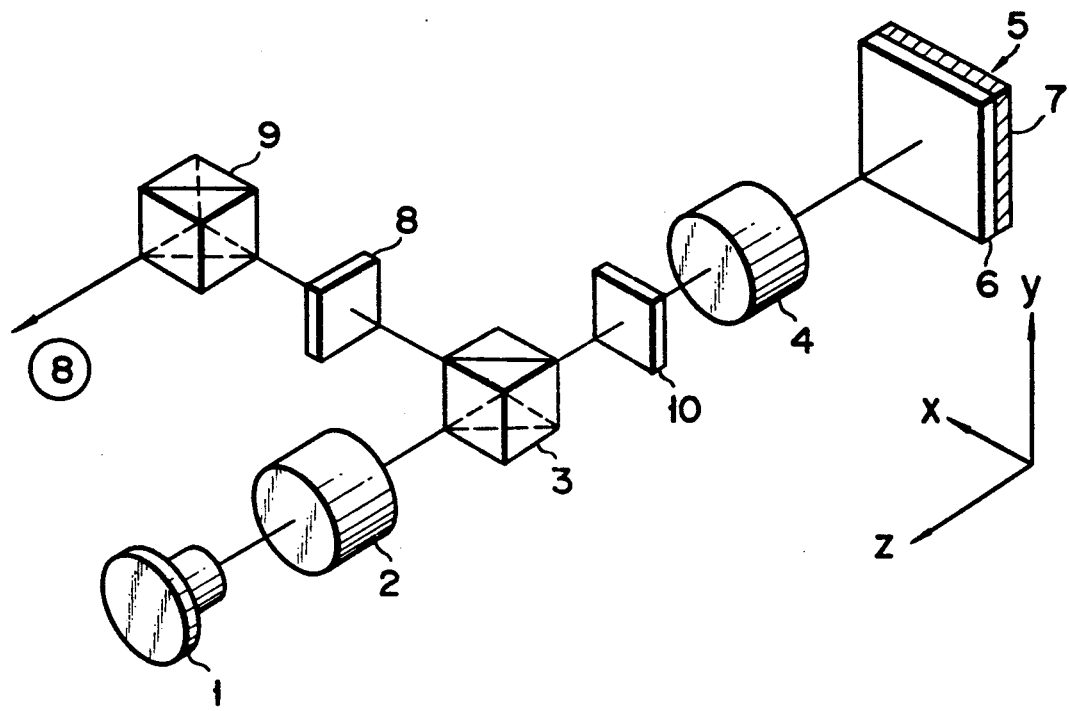
FIG. 9 is a perspective view showing an optical system according to an eighth embodiment of the present invention.
Figure 8:
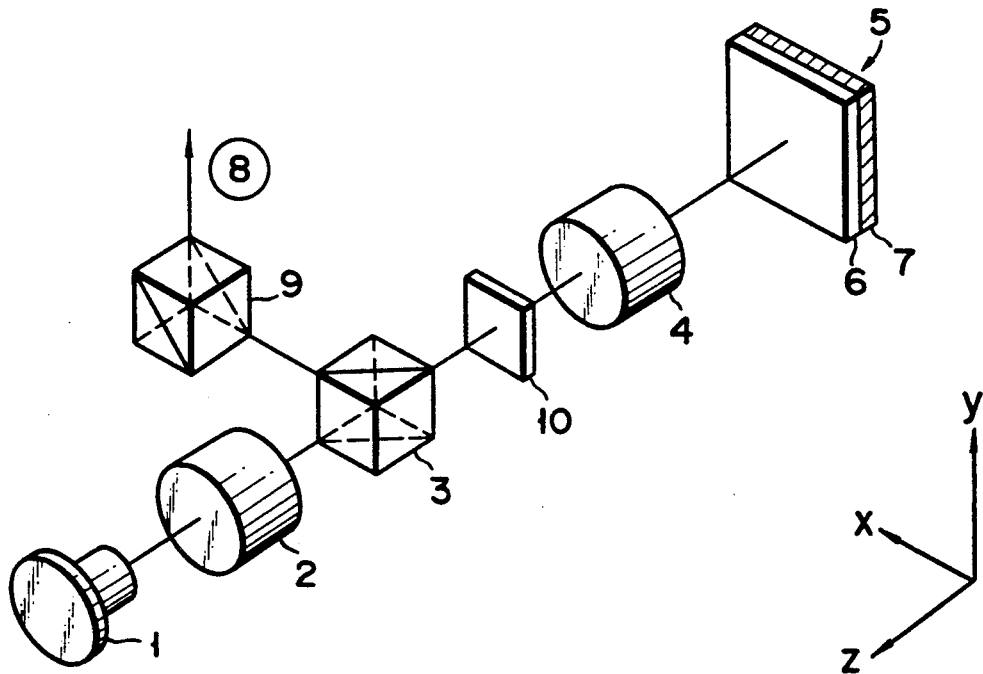
FIG. 8 is a perspective view showing an optical system according to a seventh embodiment of the present invention.

FIGS. 8 and 9 show seventh and eight embodiments of the present invention. In the seventh embodiment, λ/4 plate 10 is arranged between first beam splitter 3 and objective lens 4 described in the fifth embodiment. In the eighth embodiment, λ/4 plate 10 is also arranged between first beam splitter 3 and objective lens 4 described in the sixth embodiment.

In this case, the intensity of a light beam at ⑧ in FIGS. 8 and 9 after the light beam is reflected by second beam splitter 9 is obtained in the same manner as in the first embodiment, as follows:

$$|E8|^2 = R7Tp3 \cdot ap^2\{Rp3Rs9 + (Rp9Rs3 - Rs9Rp3) \sin^2\gamma/2\}$$

In this case, since beam splitters 3 and 9 have the identical properties, i.e., a relationship of $Rp9Rs3 - Rs9Rp3 = 0$ is established, $|E7|^2 = R7Rp3Rs9Tp3 \cdot ap^2$. As is apparent from this equation, similar to the first embodiment, the intensity and polarization state of the light beam detected by the optical detector are not influenced by birefringence.

In the first to eighth embodiments described above, first and second beam splitters 3 and 9 are arranged to reflect a light beam returned from the optical memory. However, second beam splitter 9 may be arranged such that a light beam returned from the optical memory is transmitted through second beam splitter 9.

FIGS. 10 to 17 respectively show ninth to 16th embodiments wherein a light beam returned from an optical memory is transmitted through first and second beam splitters.

Figure 10:
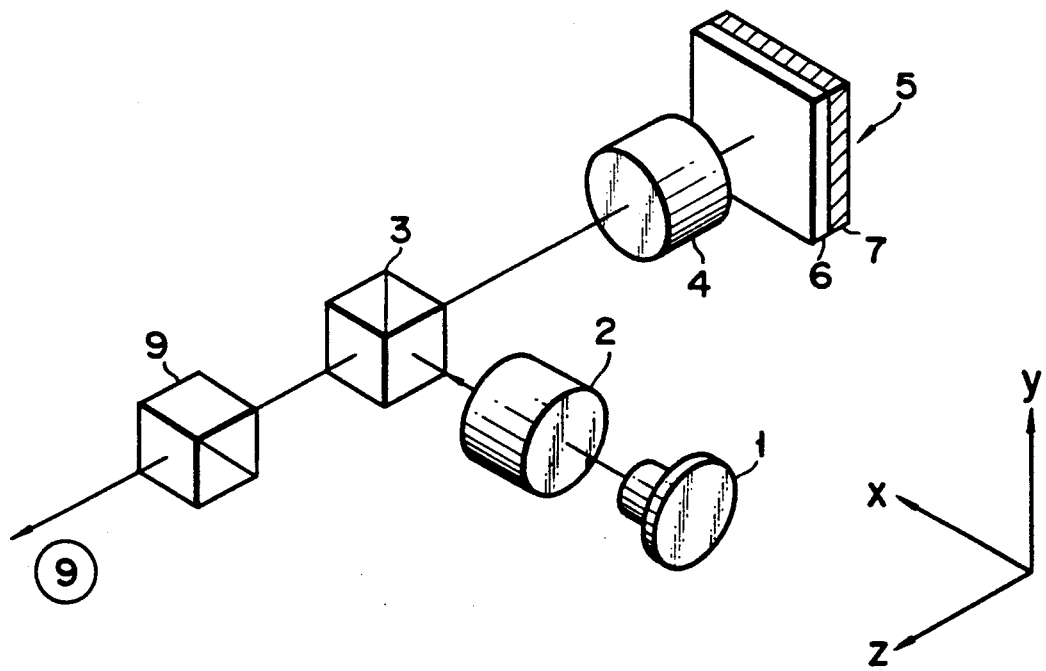
FIG. 10 is a perspective view showing an optical system according to a ninth embodiment of the present invention.

FIG. 10 shows the ninth embodiment. Referring to FIG. 10, a linearly polarized light beam is emitted from laser light source 1 toward the bonding surface of first beam splitter 3. The emitted light beam is collimated by collimator lens 2, and is incident on first beam splitter 3. The light beam incident on beam splitter 3 is reflected by its bonding surface and is incident on objective lens 4. The light beam incident on objective lens 4 is focused thereby and is focused on recording layer 7 through transparent substrate 6 of optical memory 5. The light reflected by recording layer 7 is returned to first beam splitter 3 through first beam splitter 3 again. The light beam incident on first beam splitter 3 is transmitted through first beam splitter 3 and incident on second beam splitter 9. Then, the light beam incident on second beam splitter 9 is transmitted therethrough and is guided to an optical detector (not shown). A detection output from the optical detector is used as a readout signal and a servo signal for focusing, tracking, or the like.

The first plane of first beam splitter 3 is perpendicular to the second plane of second beam splitter 9. In other words, second beam splitter 9 is arranged such that the relationship of the p- and s-polarized light components of the light beam transmitted through first beam splitter 3 is reversed. Therefore, identical transmittances are effected on the p- and s-polarized components, and the polarization state can be preserved. The intensity of the light beam at ⑨ after it is transmitted through first and second beam splitters 3 and 9 is represented by the following equation. Note that, in this case, the light source emits a p-polarized light beam perpendicular to the s-polarized light in the first embodiment toward the beam splitter on which the light beam is incident first.

$$|E9|^2 = Rp3R7ap^2\{Tp3Ts9 + (Tp3Ts9 - Ts3Tp9) \sin^2\gamma/2 \sin^2\alpha\}$$

In this case, since beam splitters 3 and 9 have the identical properties, i.e., a relationship of $Tp3Ts9 - Ts3Tp9 = 0$ is established, $|E9|^2 = Rp3R7ap^2Tp3Ts9$. As is apparent from this equation, similar to the ninth embodiment, the intensity of the light beam radiated onto the optical detector is not influenced by birefringence.

Figure 11:
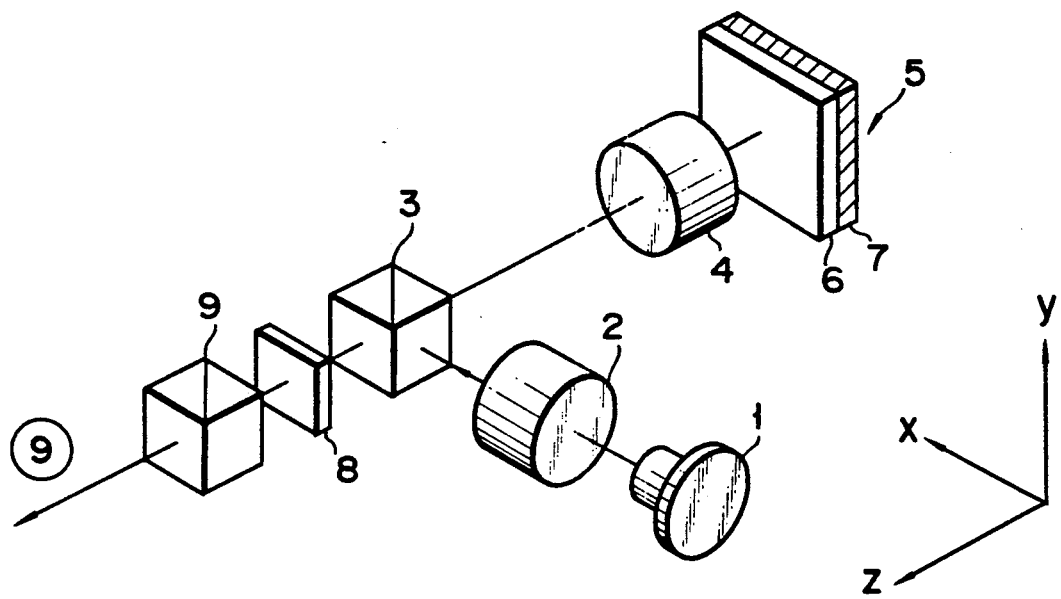
FIG. 11 is a perspective view showing an optical system according to a tenth embodiment of the present invention.

FIG. 11 shows the tenth embodiment of the present invention.

In this embodiment, λ/2 plate 8 is added. In addition, the first surface of the first beam splitter is identical to the second plane of the second beam splitter. With this arrangement, the same effects as in the ninth embodiment can be obtained. That is, the intensity of the light beam after it is transmitted through second beam splitter 9 is represented by $$|E9|^2 = Rp3R7ap^2Tp3Ts9.$$

Figure 12:
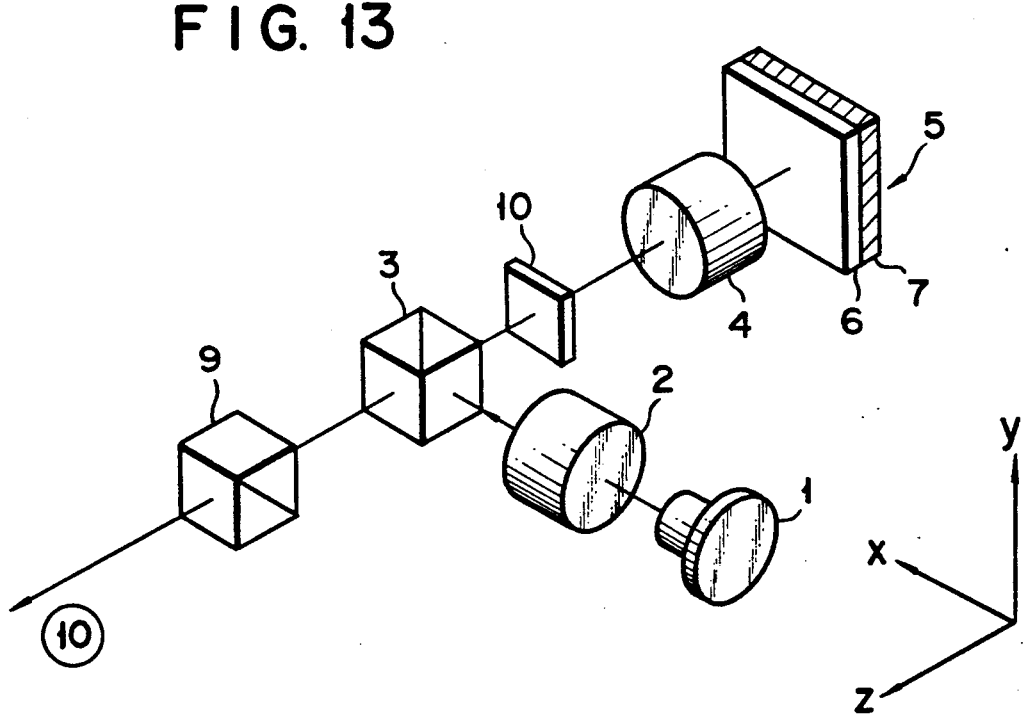
FIG. 12 is a perspective view showing an optical system according to an 11th embodiment of the present invention.

FIG. 12 shows the 11th embodiment of the present invention.

In the 11th embodiment, λ/4 plate 10 is interposed between first beam splitter 3 and objective lens 4 in the ninth embodiment.

In this case, the intensity of a light beam reflected by second beam splitter 9, i.e., at ⑩ in FIG. 12, is represented by:

$$|E10|^2 = R7Rp3ap^2\{Ts3Tp9 + (Ts3Tp9 - Tp3Ts9) \sin^2\gamma/2\}$$

In this case, since beam splitters 3 and 9 have the identical properties, i.e., a relationship of $Ts3Tp9 - Tp3Ts9 = 0$, the intensity of the light beam at ⑩ is represented by $|E10|^2 = R7Rp3ap^2Ts3Tp9$. Therefore, the intensity and polarization state of the light beam radiated on the optical detector are not influenced by birefringence.

Figure 13:
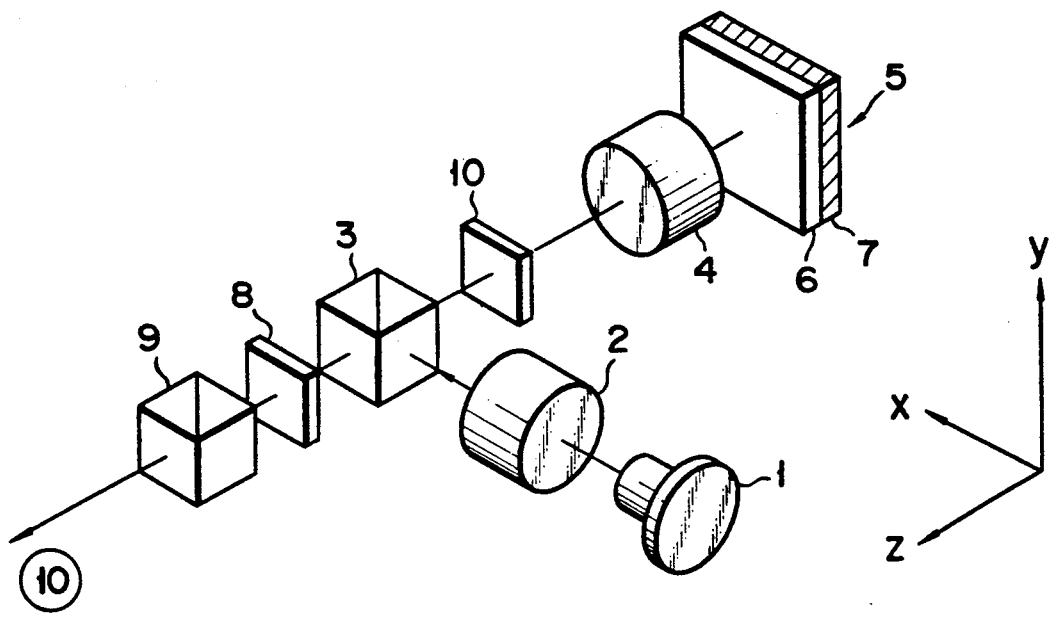
FIG. 13 is a perspective view showing an optical system according to a 12th embodiment of the present invention.

FIG. 13 shows the 12th embodiment of the present invention. In the 12th embodiment, λ/4 plate 10 is interposed between first beam splitter 3 and objective lens 4 in the tenth embodiment. Similar to the 11th embodiment, in the 12th embodiment, the intensity and polarization state of the light beam detected by optical detector are not influenced by birefringence.

Figure 14:
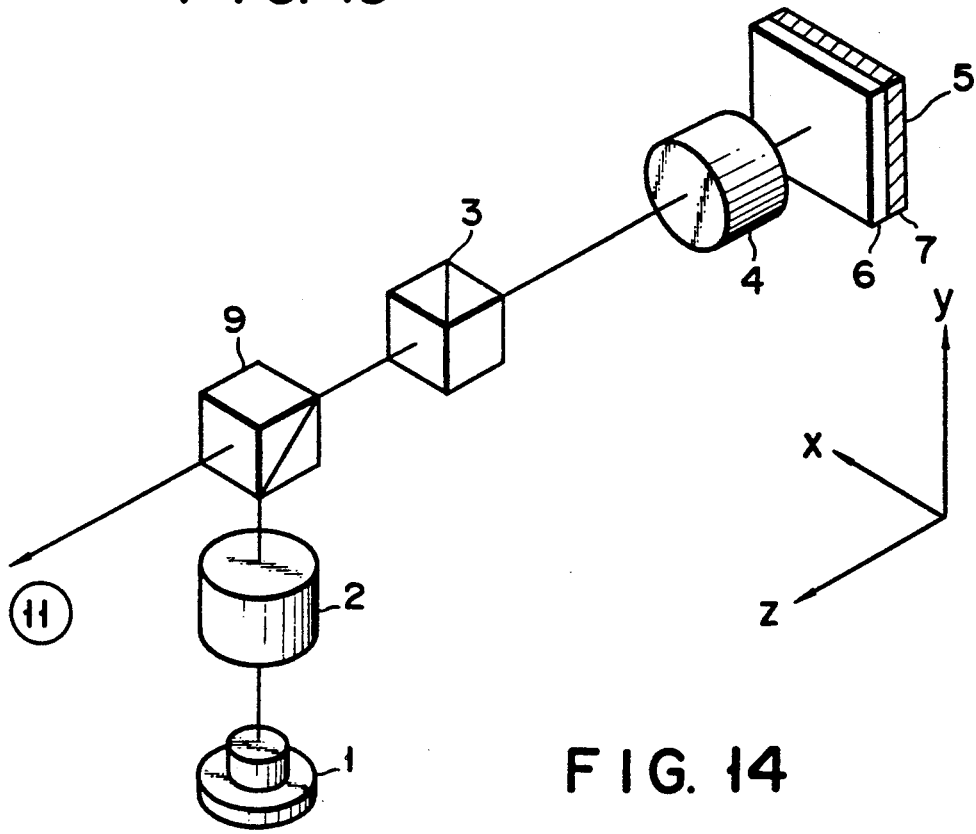
FIG. 14 is a perspective view showing an optical system according to a 13th embodiment of the present invention.

FIG. 14 shows the 13th embodiment of the present invention.

In the 13th embodiment, a light beam emitted from laser light source 1 is incident on second beam splitter 9 through collimator lens 2. After the light beam is reflected by beam splitter 9, the light beam is incident on optical memory 5 through beam splitter 3 and objective lens 4. Light beam reflected by recording layer 7 is output from second beam splitter 9 through the same optical path as in the ninth embodiment. Therefore, the intensity of the light beam at ⑪ in FIG. 14 after it is transmitted through second beam splitter 9 is represented by:

$$|E11|^2 = R7Rp3Ts3ap^2\{Ts3Tp9 + (Ts3Tp9 - Ts9Tp3) \sin^2\gamma/2 \cdot \sin^2 2\alpha\}$$

In this case, since beam splitters 3 and 9 have the identical properties, i.e., a relationship of $Ts3Tp9 - Ts9Tp3 = 0$ is established, the intensity of the light beam at ① is represented by $|E11|^2 = R7Rp3Ts3ap^2Ts3Tp9$. Therefore, the intensity and polarization state of the light beam radiated onto the optical detector are not influenced by birefringence.

Figure 15:
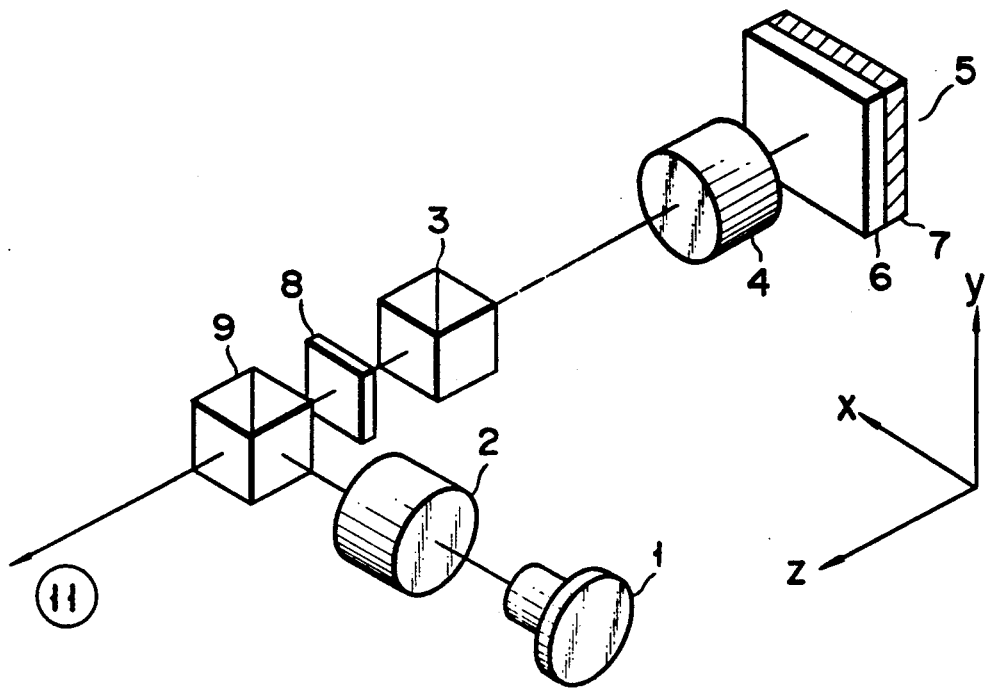
FIG. 15 is a perspective view showing an optical system according to a 14th embodiment of the present invention.

FIG. 15 shows the 14th embodiment of the present invention.

In the 14th embodiment, first, a light beam emitted from laser light source 1 is incident on second beam splitter 9 through collimator lens 2. The light beam reflected by beam splitter 9 is transmitted such that its polarization plane is rotated by λ/2 plate 8. The light beam passing through λ/2 plate 8 is radiated on optical memory 5 through first beam splitter 3 and objective lens 4. A elliptically polarized light beam emerging from recording layer 7 through the protective layer is output from second beam splitter 9 through the same optical path as in the tenth embodiment. Therefore, the intensity and polarization state of the light beam at after it is transmitted through second beam splitter 9 are not influenced by birefringence.

Figure 16:
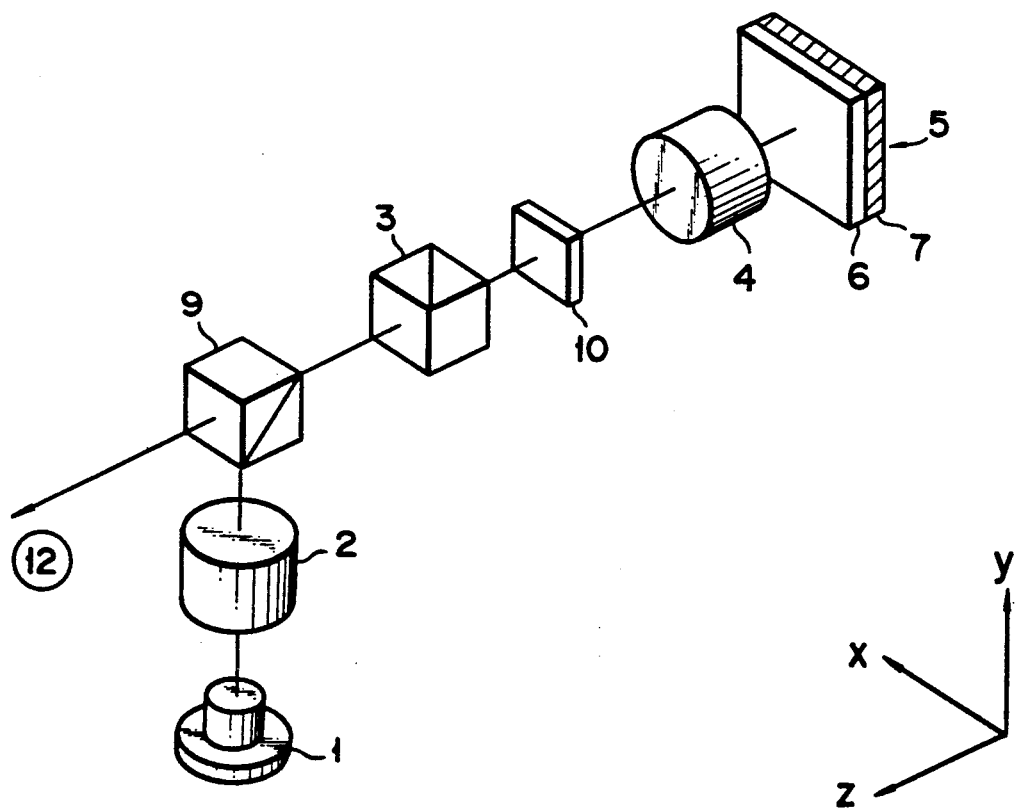
FIG. 16 is a perspective view showing an optical system according to a 15th embodiment of the present invention.

FIG. 16 shows the 15th embodiment of the present invention.

In the 15th embodiment, first, a light beam emitted from laser light source 1 is incident on second beam splitter 9 through collimator lens 2. The light beam reflected by second beam splitter 9 is incident on λ/4 plate 10 through first beam splitter 3 and is converted into a circularly polarized beam. This beam is incident on optical memory 5 through objective lens 4. The elliptically polarized light beam reflected by recording layer 7 through the protective layer emerges from second beam splitter 9 through the same optical path as in the 11th embodiment. Therefore, similar to the 11th embodiment, the intensity and polarization state of the light beam at ② after it is transmitted through second beam splitter 9 are not influenced by birefringence.

Figure 17:
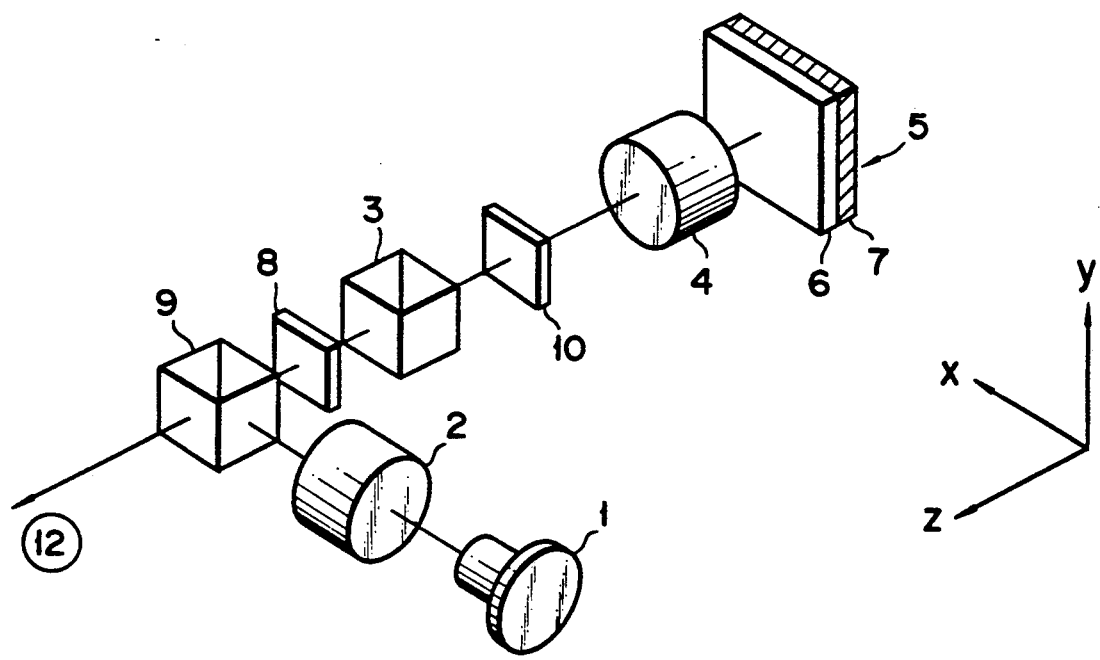
FIG. 17 is a perspective view showing an optical system according to a 16th embodiment of the present invention.

FIG. 17 shows the 16th embodiment of the present invention.

In the 16th embodiment, first, a light beam emitted from laser light source 1 is incident on second beam splitter 9 through collimator lens 2. The optical system in the embodiment is designed such that the light beam reflected by second beam splitter 9 is radiated onto optical memory 5 through λ/2 plate 8, first beam splitter 3, λ/4 plate 10, and objective lens 4. An elliptically polarized light beam reflected by recording layer 7 through the protective layer emerges from second beam splitter 9 through the same optical path as in the 12th embodiment. Therefore, the intensity of the light beam transmitted through second beam splitter 9 is represented by:

$$|E12|^2 = R7Rp9Ts3ap^2\{Tp3Ts9 + (Tp3Ts9 - Tp9Ts3) \sin^2\gamma/2\}$$

In this case, since beam splitters 3 and 9 have the identical properties, i.e., a relationship of $Tp3Ts9 - Tp9Ts3 = 0$ is established, the intensity of the light beam at ② is represented by $|E13|^2 = R7Rp9Ts3ap^2Tp3Ts9$. Accordingly, the intensity and polarization state of the light beam radiated onto the optical detector are not influenced by birefringence.

In the all embodiments described above, the bonding surfaces of first and second beam splitters 3 and 9 are predetermined such that the polarization state of a light beam from the optical memory is maintained. With this arrangement, the intensity of a light beam is not influenced by birefringence. In practice, the polarization state of a light beam is maintained. Since the intensity and polarization state of a light beam detected in this manner are not influenced by birefringence, readout signals and servo control signals for focusing, tracking, and the like can be reliably supplied.

In addition, the locations of beam splitters in the present invention may be changed as long as the same effects as described above can be obtained.

Figure 18:
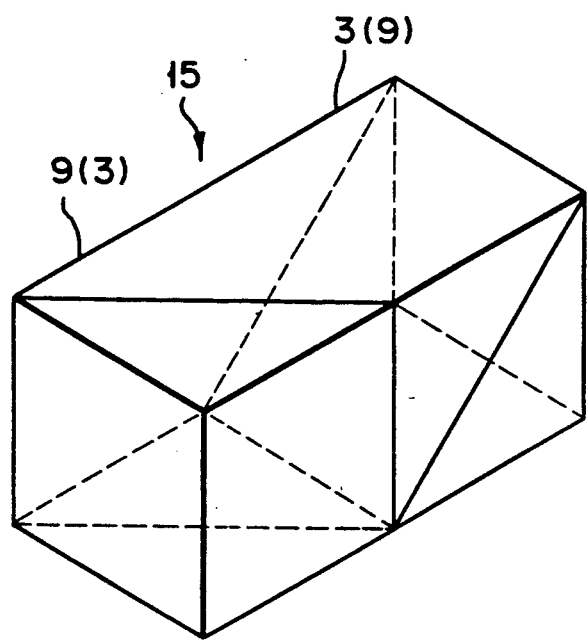
FIG. 18 is a perspective view of an optical element of the optical system according to the present invention.

The two beam splitters are separately arranged in each of the optical systems in FIGS. 1 to 17. However, these beam splitters need not be separately arranged. For example, as shown in FIG. 18, beam splitters may be replaced by an optical element 15 to obtain a desired property, i.e., a property for preserving the polarization state. When optical element 15 is arranged in the system, relative positional adjustment of first and second beam splitters 3 and 9 can be omitted. For this reason, the optical system can be more easily arranged. Optical element 15 may be replaced by first and second beam splitters 3 and 9 shown in FIGS. 4, 6, 8, 10, 12, 14, or 16.

What is claimed is:

1. An optical system, comprising:
 means for generating a linearly polarized light beam;
 an optical memory including a reflection layer and a birefringent transparent layer provided on the reflection layer, wherein the polarized light beam is incident on the birefringent transparent layer at a non-zero angle with respect to the fast and slow axes thereof to form two components of said light beam and to give an optical retardation to one component of the beam, and the light beam emerging from the transparent layer has a first amplitude ratio of the two components;
 means for converging the polarized light beam onto the reflection layer of said optical memory through the transparent layer of said optical memory;
 a first beam splitter, having an optical characteristic, for reflecting the light beam reflected from the reflection layer and passing through the transparent layer and said converging means to have a second amplitude ratio of two components different from the first amplitude ratio;
 a λ/4 plate disposed between said converging means and said first beam splitter; and
 a second beam splitter, having the same optical characteristic as said first beam splitter, for reflecting the light beam from the first beam splitter to have a third amplitude ratio of the two components which is the same as the first amplitude ratio.

2. The system according to claim 1, further comprising:
 a λ/2 plate arranged between the first and second beam splitters;
 wherein said two beam splitters are disposed such that their planes of reflection are parallel to each other.

3. An optical system, comprising:
 means for generating a linearly polarized light beam;
 an optical memory including a reflection layer and a birefringent transparent layer provided on the reflection layer, wherein the polarized light beam is incident on the birefringent transparent layer at a non-zero angle with respect to the fast and slow axes thereof to form two components of said light beam and to have an optical retardation to one component of the beam and the light beam emerging from the transparent layer has a first amplitude ratio of the two components;

means for converging the polarized light beam onto the reflection layer of said optical memory through the transparent layer of said optical memory;

a first beam splitter, having an optical characteristic, for transmitting the light beam reflected from the reflection layer and passing through the transparent layer and said converging means to have a second amplitude ratio of two components different from the first amplitude ratio;

a λ/4 plate disposed between said converging means and said first beam splitter; and a second beam splitter, having the same optical characteristic as said first beam splitter, for transmitting the light beam from the first beam splitter to have a third amplitude ratio of two components which is the same as the first amplitude ratio.

4. An optical system, comprising:

an optical memory including a reflection layer and a birefringent transparent layer provided on the reflection layer;

means for providing a first linearly polarized light beam;

means for converging the first polarized light beam onto the reflection layer to said optical memory through the transparent layer of said optical memory, wherein the first polarized light beam is incident on the birefringent transparent layer at a non-zero angle with respect to the fast and slow axes thereof to form two components of the first light beam and to give an optical retardation to one component of the beam, and the first light beam emerging from the transparent layer has a first amplitude ratio of the two components;

a first beam splitter for reflecting the first light beam reflected from the reflection layer and passing the transparent layer and said converging means and obtaining a second light beam having a second amplitude ratio of the two components different from the first amplitude ratio;

a λ/4 plate disposed between said converging means and said first beam splitter; and a second beam splitter for reflecting the second light beam from the first beam splitter and obtaining a third light beam having a third amplitude ratio of two components which is the same as the first amplitude ratio.

5. An optical system according to claim 4, further comprising a λ/2 plate arranged between the first and second beam splitters, wherein the first and second beam splitters are disposed such that the planes of reflection are parallel to each other.

6. An optical system, comprising: an optical memory including a reflection layer and a birefringent transparent layer formed on the reflection layer;

means for converging a linearly polarized light beam onto the reflection layer through the transparent layer, the converged light beam being reflected from the reflection layer to said converging means through the transparent layer along a first direction, wherein the linearly polarized light beam is incident on the birefringent transparent layer at a non-zero angle with respect to the fast and slow axes thereof to form two components of the first light beam and to give an optical retardation to one component of the beam, and the light beam emerging from the transparent layer has a first amplitude ratio of the two components;

a first beam splitter having an optical characteristic and including a first beam splitting surface for reflecting the light beam passing through said converging means along a second direction perpendicular to the first direction to have a second amplitude ratio different from the first amplitude ratio;

a second beam splitter having the same optical characteristic as said first beam splitter and including a second beam splitting surface for reflecting the light beam from the first beam splitter along a third direction perpendicular to the first and second directions so that a light beam having a third amplitude ratio which is the same as the first ratio emerges from the second beam splitter; and means for detecting the light beam reflected from said second beam splitter.

7. An optical system according to claim 6, further, comprising:

means for generating the linearly polarized light beam, the generated light beam being guided to the first beam splitting surface of the first beam splitter through said second beam splitter along a direction opposite to the second direction and reflected to said converging means along a direction opposite to the first direction.

8. An optical system according to claim 7, further comprising:

a λ/4 plate disposed between said first beam splitter and said converging means.

9. An optical system according to claim 6, further comprising:

means for generating the linearly polarized light beam, the generated light beam being guided to said converging means through said first beam splitter along the direction opposite to the first direction.

10. An optical system according to claim 9, further comprising:

a λ/4 plate disposed between said first beam splitter and said converging means.

11. An optical system according to claim 6, further comprising:

a λ/4 plate disposed between said first beam splitter and said converging means.

12. An optical system, comprising:

an optical memory including a reflection layer and a birefringent transparent layer formed on the reflection layer;

means for converging a linearly polarized light beam onto the reflection layer through the transparent layer, the converged light beam being reflected from the reflection layer to said converging means through the transparent layer along a first direction, wherein the linearly polarized light beam is incident on the birefringent transparent layer at a non-zero angle with respect to the fast and slow axes thereof to form two components of the light beam and to give an optical retardation to one component of the beam, and the light beam emerging from the transparent layer has a first amplitude ratio of the two components;

a first beam splitter having an optical characteristic and including a first beam splitting surface for reflecting the light beam passing through said converging means along a second direction perpendicular to the first direction to have a second amplitude ratio of two components different from the first amplitude ratio;

a λ/2 plate for allowing the light beam to pass therethrough and rotating the two components by 90°;

a second beam splitter having the same optical characteristic as said first beam splitter and having a second beam splitting surface, the first and second beam splitting surfaces being arranged such that planes of reflection are parallel to each other for reflecting the light beam passing through said λ/2 plate along the third direction to have a third amplitude ratio of two components which is the same as the first amplitude ratio; and means for detecting the light beam reflected from said second beam splitter.

13. An optical system according to claim 12, further comprising:

means for generating the linearly polarized light beam, the generated light beam being guided to the first beam splitting surface of the first beam splitter through said second beam splitter along a direction opposite to the second direction and reflected to said converging means along a direction opposite to the first direction.

14. An optical system according to claim 13, further comprising:

a λ/4 plate disposed between said first beam splitter and said converging means.

15. An optical system according to claim 12, further comprising:

means for generating the linearly polarized light beam, the generated light beam being guided to said converging means through said first beam splitter along the direction opposite to the first direction.

16. An optical system according to claim 15, further comprising:

a λ/4 disposed between said first beam splitter and said converging means.

17. An optical system according to claim 12, further comprising:

a λ/4 plate disposed between said first beam splitter and said converging means.

18. An optical system, comprising:

an optical memory including a reflection layer and a birefringent transparent layer formed on the reflection layer;

means for converging a linearly polarized light beam onto the reflection layer through the transparent layer, the converged light beam being reflected from the reflection layer to said converging means through the transparent layer along a first direction, wherein the linearly polarized light beam is incident on the birefringent transparent layer at a non-zero angle with respect to the fast and slow axes thereof to form two components of the first light beam and to give an optical retardation to one component of the beam, and the light beam emerging from the transparent layer has a first amplitude ratio of the two components;

a first beam splitter having an optical characteristic and including a first beam splitting surface having a first normal axis, for allowing the light beam passing through said converging means to pass therethrough;

a second beam splitter having the same optical characteristic as said first beam splitter and including a second beam splitting surface having a second normal axis perpendicular to the first normal axis, for allowing the light beam from the first beam splitter to pass therethrough so that the light beam having an amplitude ratio of the two components emerges from the second beam splitter; and means for detecting the light beam transmitted through said second beam splitter.

19. An optical system according to claim 18, further comprising:

means for generating the linearly polarized light beam, the generated light beam being reflected to the first beam splitting surface of the first beam splitter by the second beam splitting surface of said second beam splitter and guided to said converging means through the first beam splitting surface of said first beam splitter.

20. An optical system according to claim 19, further comprising:

a λ/4 plate disposed between said first beam splitter and said convering means.

21. An optical system according to claim 18, further comprising:

means for generating the linearly polarized light beam, the generated light beam being reflected to said converging means by the first reflection surface of said first beam splitter.

22. An optical system according to claim 21, further comprising:

a λ/4 plate disposed between said first beam splitter and said converging means.

23. An optical system according to claim 18, further comprising:

a λ/4 plate disposed between said first beam splitter and said converging means.

24. An optical system, comprising:

means for generating a linearly polarized light beam;

an optical memory including a reflection layer and a birefringent transparent layer formed on the reflection layer;

means for converging the linearly polarized light beam onto the reflection layer through the transparent layer, the converged light beam being reflected from the reflection layer to said converging means through the transparent layer, wherein the linerly-polarized light beam is incident on the birefringent transparent layer at a non-zero angle with respect to the fast and slow axes thereof to form two components of the light beam and to give an optical retardation to one component of the beam, and the light beam emerging from the transparent layer has an amplitude ratio of the two components;

a first beam splitter having an optical characteristic and a first beam splitting surface, for allowing the light beam passing through said converging means to pass therethrough;

a λ/2 plate for allowing the light to pass therethrough and rotating the two components by 90°;

a second beam splitter having the same optical characteristic as said first beam splitter and having a second beam splitting surface, the linearly polarized light beam generated by said generating means being reflected to the first beam splitting surface of the first beam splitter through the λ/2 plate by the second beam splitting surface of said second beam splitter, and being guided to said converging means through the first beam splitting surface of said first beam splitter, the first and second beam splitting surfaces being arranged such that planes of reflection are parallel to each other, for allowing the light beam passing through said λ/2 plate to pass therethrough so that the light beam having an amplitude ratio of two components emerges from the second beam splitter; and means for detecting the light beam transmitted through said second beam splitter.

25. An optical system according to claim 24, further comprising:
a λ/4 plate disposed between said first beam splitter and said converging means.

26. An optical system, comprising:
means for generating a linearly polarized light beam;
an optical memory including a reflection layer and a birefringent transparent layer formed on the reflection layer;
means for converging the linearly polarized light beam onto the reflection layer through the transparent layer, the converged light beam being reflected from the reflection layer to said converging means through the transparent layer, wherein the linearly polarized light beam is incident on the birefringent transparent layer at a non-zero angle with respect to the fast and slow axes thereof to form two components of the light beam and to give an optical retardation to one component of the beam, and the light beam emerging from the transparent layer has an amplitude ratio of the two components;
a first beam splitter having an optical characteristic and a first beam splitting surface, for allowing the light beam passing through said converging means to pass therethrough, the light beam generated by said generating means being reflected to said converging means by the first reflection surface of said first beam splitter;
a λ/2 plate for allowing the light beam to pass therethrough and rotating the two components by 90°;
a second beam splitter having the same optical characteristic as said first beam splitter and having a second beam splitting surface, the first and second beam splitting surfaces being arranged such that planes of reflection are parallel to each other, for allowing the light beam passing through said λ/2 plate to pass therethrough so that the light beam having an amplitude ratio of two components emerges from the second beam splitter; and means for detecting the light beam transmitted through said second beam splitter.

27. An optical system according to claim 26, further comprising:
a λ/4 plate disposed between said first beam splitter and said converging means.

28. An optical system, comprising:
an optical memory including a reflection layer and a birefringent transparent layer formed on the reflection layer; means for converging a linearly polarized light beam onto the reflection layer through the transparent layer, the converged light beam being reflected from the reflection layer to said converging means through the transparent layer, wherein the linearly polarized light beam is incident on the birefringent transparent layer at a non-zero angle with respect to the fast and slow axes thereof to form two components of the light beam and to give an optical retardation to one component of the beam, and the light beam emerging from the transparent layer has an amplitude ratio of the two components;
a first beam splitter having an optical characteristic and a first beam splitting surface, for allowing the light beam passing through said converging means to pass therethrough;
a λ/2 plate for allowing the light beam to pass therethrough and rotating the two components by 90°;
a second beam splitter having the same optical characteristic as said first beam splitter and having a second beam splitting surface, the first and second beam splitting surfaces being arranged such that planes of reflection are parallel to each other, for allowing the light beam passing through said λ/2 plate to pass therethrough so that the light beam having an amplitude ratio of two components emerges from the second beam splitter;
a λ/4 plate disposed between said first beam splitter and said converging means; and
means for detecting the light beam transmitted through said second beam splitter.

* * * * *